United States Patent

Maekawa et al.

[15] 3,652,839

[45] Mar. 28, 1972

[54] PULSE ALLOTTING SYSTEM OF CURVE TRACING EQUIPMENT

[72] Inventors: Takasumi Maekawa; Ryoichi Yoshida, both of Tokyo; Minoru Nishihara, Yokohama, all of Japan

[73] Assignee: Toyo Denki Seizo Kabushiki Kaisha, Tokyo, Japan

[22] Filed: Mar. 6, 1970

[21] Appl. No.: 17,277

Related U.S. Application Data

[63] Continuation-in-part of Ser. No. 575,816, Aug. 29, 1966, abandoned.

[30] Foreign Application Priority Data

Sept. 7, 1965 Japan....................................40/54428

[52] U.S. Cl.............................................................235/152
[51] Int. Cl........................................G06f 7/38, G06f 15/46
[58] Field of Search.....................235/152, 151.11, 156, 168

[56] References Cited

UNITED STATES PATENTS

| | | | |
|---|---|---|---|
| 3,254,203 | 5/1966 | Kveim | 235/152 |
| 3,372,268 | 3/1968 | Hoernes | 235/151.11 |

OTHER PUBLICATIONS

Danielsson, Incremental Curve Generator " IEEE Trans. on Computers" Vol. C–19, No. 9, Sept. 1970 pp. 783–793

*Primary Examiner*—Malcolm A. Morrison
*Assistant Examiner*—David H. Malzahn
*Attorney*—Sughrue, Rothwell, Mion, Zinn & Macpeak

[57] ABSTRACT

A pulse allotting system for use in a pulse allotter of a curve tracing equipment such as a numerical control system, wherein a curve is traced by allotting pulses having components corresponding to X and Y axes. The allotment is based on a series of judgements each of which selects a judging point having coordinates displaced by ( $\Delta x/2, \Delta y/2$) from a point having coordinates $x$ and $y$ and where $\Delta x$ and $\Delta y$ are increments of $x$ and $y$, said point $x$ $y$ being either an initial starting point or a point by which the curve is traced and to judge whether said judging point is situated in a positive region or a negative region of the curve to be traced. The system comprises a means to effect allotment of a series of pulses each of which corresponds to the increment of $\Delta x$ and $\Delta y$ along a direction parallel to the X axis or to the Y axis based upon the judgement at said judging point according to whether the corresponding judging point is situated in a positive region or a negative region of the curve to be traced.

The system can afford further improvement in addition to the above mentioned initial judgement by selecting a second judging point in each of the judgements in accordance with the result of the initial judgement, in which said second judging point has co-ordinates displaced by either ($\Delta x, \Delta y/2$) or ( $\Delta x/2, \Delta y$) according to the initial judgement from an initial starting point or from a point by which the curve is traced. The system includes means to effect allotment of a series of pulses each of which corresponds to an increment of $\Delta x$ or $\Delta y$ along the X axis or the Y axis or both X and Y axes based upon the above two judgements. According to the system a great improvement in tracing accuracy can be obtained while using a very simple construction.

24 Claims, 24 Drawing Figures

PULSE ALLOTTING SYSTEM OF CURVE TRACING EQUIPMENT

CROSS-REFERENCES TO RELATED APPLICATION

This application is a continuation in part of applicants' copending application Ser. No. 575,816, filed on Aug. 29, 1966, now abandoned.

BACKGROUND OF THE INVENTION

1. Field of the Invention:

The present invention generally relates to an improved pulse allotting system for curve tracing equipment, and more particularly to a novel curve tracing equipment which can trace lines and curves with improved accuracy by using a simple logic circuit.

2. Description of the Prior Art:

In a conventional pulse allotting system of a numerical controlling system, the pulse allotting is effected in the following manner.

In tracing a curve $f(x,y)=0$ by accumulating allotted pulses of the X and Y axes to an initial value which corresponds to the starting point of the allotment of pulses, usually the allotment is decided by a principle of judging the polarity of the region wherein the starting point or accumulated point therefrom belongs with respect to the curve $f(x,y)=0$ to be traced. According to the result of said judgement a pulse is allotted either in the direction of the X axis or the direction of the Y axis and thus the curve or linear line is traced.

The conventional system is in general expressed by the following formula (1). The judgement is effected based on whether the formula is positive or negative, i.e. either condition (1*a*) or (1*b*) and the pulse is allotted in either one of the X or Y directions.

$$\left.\begin{matrix} f(x_i,y_i)\geqq 0 & (1a) \\ f(x_i,y_i)<0 & (1b) \end{matrix}\right\}(1)$$

For instance, in case the equation is positive or zero, i.e., condition (1*a*), a pulse is allotted in the X direction, and in case the equation is negative, i.e., condition (1*b*), a pulse is allotted in the Y direction.

Such a known system has a disadvantage in that the tracing lacks accuracy in spite of the complexity of the operational principle.

There is also known a pulse allotting system in which the pulses are allotted in either the X or the Y directions dependent on a judgement of direction of a tangent to the curve at a judging point.

This system has a drawback in that the operational circuit becomes too complicated and also the tracing accuracy is not in a good order despite the fact of complexity of the operational circuit.

SUMMARY OF THE INVENTION

In accordance with one character of the invention, a curve $f(x,y)$Ax0 is traced by accumulating allotted pulses of X and Y axes to the initial value or the accumulated value therefrom, and the pulse allotment is decided by a principle of judging polarity of the region wherein a predetermined judging point belongs with respect to the curve $f(x,y)=0$, to be traced. The judging point is selected to be a point having co-ordinate of an ahead value of $(\Delta x/2, \Delta y/2)$ with respect to said initial value or accumulated value therefrom, and the judgement is based on a principle whether the judging point is in positive region or in negative region from the curve or a linear line to be traced.

This allotting system may be expressed by the following formula:

$$\left.\begin{matrix} f(x_i+\Delta x/2,\ y_i+\Delta y/2)\geqq 0 & (2a) \\ f(x_i+\Delta x/2,\ y_i+\Delta y/2)<0 & (2b) \end{matrix}\right\}(2)$$

In formula (2), the left term is a general formula representing the co-ordinate of the judging point. In case the value of this term is equal to zero or positive, i.e., condition (2*a*), a pulse is allotted in the direction of the X axis, and in case this value is negative i.e., condition (2*b*), a pulse is allotted in the direction of the Y axis.

According to the pulse allotting system of the invention, the judgement is always effected at a point having an ahead co-ordinate value by $(\Delta x/2, \Delta y/2)$ to the accumulated tracing point having co-ordinate value of $(x_o, y_o)$. Then the curve or linear line is traced by pulse allotment based on result of said judgement; accordingly, a tracing of higher accuracy is obtained.

In accordance with the further character of the invention, a still further improvement in tracing accuracy can be obtained. In another aspect of the invention, when tracing a curve represented by a formula $f(x,y)=0$ by allotting pulses in the X axis and the Y axis and accumulating them to the initial value, at first a first judging point in a co-ordinate having an ahead value of $(\Delta x/2, \Delta y/2)$ to said initial value or the accumulated value therefrom is selected. Then a first judgement is effected whether said first judging point is located in positive region or in negative region of the curve $f(x,y)=0$ to be traced. As a next stage, a second judging point is selected of which co-ordinate having an ahead value of $(\Delta x, \Delta y/2)$ or $(\Delta x/2, \Delta y)$ from the initial value or the accumulated point. Finally a pulse is allotted either in the X axis or the Y axis or to the both of them, by judging whether the said second judging point is in the positive region or negative region with respect to the curve to be traced, in each condition of the first judgement.

As a summary according to the invention the following four judgements are effected.

I. In the case where the first judging point is positive or zero, i.e., $$f(x_i+\Delta x/2, y_i+\Delta y/2)\geqq 0$$

Another second judging point is selected which is shifted in direction parallel to the X axis.

$$\left.\begin{matrix} f(x_i+\Delta x,\ y_i+\Delta y/2)\geqq 0 & (3a) \\ f(x_i+\Delta x,\ y_i+\Delta y/2)<0 & (3b) \end{matrix}\right\}(3)$$

II. In the opposite case where the first judging point is negative, i.e., $$f(x_i+\Delta x/2, y_i+\Delta y/2)<0$$

Another second judging point is selected which is shifted in direction parallel to the Y axis.

$$\left.\begin{matrix} f(x_i+\Delta x/2,\ y_i+\Delta y)\geqq 0 & (3c) \\ f(x_i+\Delta x/2,\ y_i+\Delta y)<0 & (3d) \end{matrix}\right\}(3)$$

In the condition of (3*a*), i.e., in the case of the first judging point is positive or zero and second judging point $f(x_i+\Delta x, y_i+\Delta y/2)$ is also positive or zero, a pulse is allotted in the direction of the X axis.

In the condition of (3*b*), i.e., in the case of the first judging point is positive or zero and second judging point $f(x_i+\Delta x, y_i+\Delta y/2)$ is negative, pulses are allotted both for direction of the X axis and the Y axis.

In the condition of (3*c*), i.e., in the case of the first judging point is negative and the second judging point is positive or zero, also pulses are allotted both in the X axis and the Y axis.

In the condition of (3*d*), i.e., in the case of the first judging point is negative and the second judging point $f(x_i+\Delta x/2, y_i+\Delta y)$ is also negative, a pulse is allotted in the direction of the Y axis.

In accordance with such improved system of the present invention, since the second judging point is selected which is shifted in either of the X axis or the Y axis according to the co-ordinate of first judging point, and the pulse allotting is effected by judging the polarity of both of first and second judging points either in the direction of the X axis or the Y axis or in the both thereof, a more accurate curve tracing is obtained. Moreover, since the pulses are distributed simultaneously in the X axis and the Y axis according to the configuration of the curve, not only a smoother curve tracing is effected but a great advantage is obtained to decrease the required tracing time.

BRIEF DESCRIPTION OF THE DRAWING

The invention will be described more in detail with reference to the accompanying drawings, wherein:

FIGS. 2*a*–2*c*, 3*a*–3*c* and 4*a*–4*c* are locus diagrams representing the tracing of a linear line, circular arc and a quadratic curve, wherein FIGS. 2*a*, 3*a*, and 4*a* represent locus diagrams drawn by conventional system, FIGS. 2*b*, 3*b* and 4*b* represent locus diagrams drawn by system of present invention and FIGS. 2*c*, 3*c* and 4*c* represent locus diagrams drawn by according to modified system of the invention;

DESCRIPTION OF THE PREFERRED EMBODIMENTS

Figures 1A, 1B, 1C, 1D:
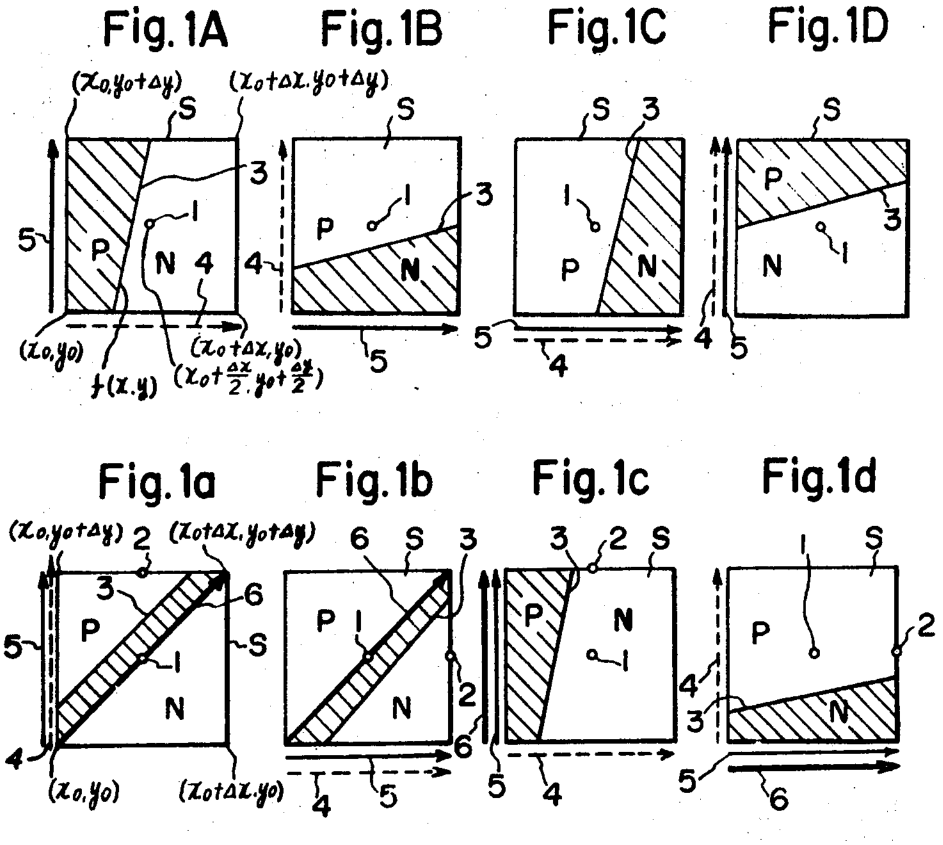
FIGS. 1A, 1B, 1C, 1D, 1*a*, 1*b*, 1*c*, 1*d* are diagrams illustrating principle of the present invention with comparison to the conventional system.

Each figure of FIG. 1 shows a small area S in the plane of the X axis and the Y axis including a curve $f(x,y)=0$ to be traced. The square shaped area S has its co-ordinates of the four corners, as illustrated in FIG. 1A and 1*a* i.e., $(x_o, y_o)$, $(x_o + \Delta x, y_o)$, $(x_o + \Delta x, y_o + \Delta y)$, $(x_o, y_o + \Delta y)$.

Each of $\Delta x$ and $\Delta y$ corresponds to the minimum unit length of movement of curve tracing equipment.

If we make the value of $\Delta x$ and $\Delta y$ sufficiently small, the curve $f(x,y)=0$ in the unit square S may be handled by regarding it as a straight line.

Accordingly, the function representing the curve may be developed as follows:

$$f(x, y) \fallingdotseq f(x_o, y_o) = (\partial f/\partial x)(x_o, y_o)(x - x_o) + (\partial f/\partial y)(x_o, y_o)(y - y_o) = 0 \quad (4)$$

The polarity of $(\partial f/\partial x)(x_o, y_o)$, and $(\partial f/\partial y)(x_o, y_o)$ is known prior to the tracing by the nature of $f(x,y)=0$.

By assuming $$\frac{\partial f}{\partial x}(x_0, y_0) \geqq 0, \frac{\partial f}{\partial y}(x_0, y_0) \geqq 0$$

the formula (4) which corresponds to a line of close approximation of $f(x,y)=0$ may be represented by either one of the figures shown in FIG. 1.

In FIG. 1A, line 3 shows a unit part of the curve to be traced. In the conventional manner of judgement, as $f(x_o, y_o) > 0$, a pulse is allotted in the direction of X axis as is determined and as shown in the figure by a dotted arrow 4.

On the contrary, by the system of the invention a judging point is selected at a point having co-ordinate of $(x_o + \Delta x/2, y_o + \Delta y/2)$, which is shown by point 1, and a judgement is effected as to whether this judging point is in a positive or negative region of curve $f(x,y)=0$.

In the case of FIG. 1A, $f(x_o + \Delta x/2, y_o + \Delta y/2) < 0$, namely the value of the equation is negative at the judging point 1 and is situated in region N as shown in the figure. In this case, a pulse is allotted in the direction of Y axis as shown by an arrow 5, and the tracement is effected.

In the same manner, if the curve 3 is situated in the position as shown in FIG. 1B, a pulse is allotted in the direction of X axis, and the tracing is effected along full line 5. In both the cases shown in FIGS. 1C and 1D, the pulse allotment of the present system coincides with that of the conventional system; however, each of these directions just coincides to the direction of better approximation to the tracing curve, which may be clearly understood by the figures, wherein these directions just coincide with the smaller areas divided by the tracing curve 3 and which are shown by hatched line.

In accordance with further aspect of the invention, a still further improvement may be obtained by a modified embodiment of the invention. In this embodiment of present invention, if said first judging point is judged as negative value, a second judging point 2 is selected which corresponds to co-ordinates of $f(x_o + \Delta x/2, y_o + \Delta y)$, as shown in FIG. 1*a*. In this case, value of said second judging point is $\geq 0$, which corresponds to aforementioned condition (3*c*). Accordingly, two pulses, one in each of the X and Y axes, are allotted and the tracing is effected in accordance with oblique line 6 as shown in the figure.

FIG. 1*b* represents aforementioned condition (3*b*), and also in this case the curve tracing is effected along the oblique line 6. In both cases of FIGS. 1*a* and 1*b*, it is apparent that the pulse allotting system of the present invention as shown by full line arrows 5 and 6 afford a material improvement in the better approximation in tracing the curve represented by $f(x, y) = 0$, as compared with conventional system shown by dotted arrow 4.

In the same manner, FIG. 1*c* corresponds to condition (3*d*), and FIG. 1*d* corresponds to condition (3*a*). In both of these cases, the directions 5 and 6 of pulse allotment according to the present invention afford material improvement in comparison to dotted arrow 4 of the conventional system.

As is shown by line 6 in FIGS. 1*a* and 1*b*, and lines 5 and 6 of FIGS. 1*c* and 1*d*, the pulse allotting system of the present invention, in the case where the length between the original point $(x_o, y_o)$ and the crossing point of the linear line, which is included in the square S, passing through the edge line $$\overline{(x_0, y_0), (x_0, y_0+\Delta y)} \text{ or } \overline{(x_0, y_0), (x_0+\Delta x, y_0)}$$

is shorter than $$|\Delta y/2| \text{ or } |\Delta x/2|,$$

it results in the fact that the length between the point which is arrived by the tracing and the crossing point of the approximate tracing line with edge line $$\overline{(x_0+\Delta x, y_0+\Delta y), (x_0, y_0+\Delta y)} \text{ or } \overline{(x_0+\Delta x, y_0+\Delta y), (x_0+\Delta x, y_0)}$$

is also shorter than $$|\Delta y/2| \text{ or } |\Delta x/2|.$$

The curve to be traced and actual tracing line coincide with each other at the point of starting; therefore, the aforementioned condition is always satisfied. Accordingly, said condition is satisfied during the tracing, and it proves that a higher approximation may be obtained in accordance with the system of the present invention.

In the condition of FIG. 1*a* or 1*b*, in accordance with the second embodiment of the invention, with only a single allotment of the pulses an access from point $(x_o, y_o)$ to $(x_o+\Delta x, y_o+\Delta y)$ is effected; therefore, the tracing time is shortened to half that compared with the conventional system.

The invention will be described more detail by way of several examples, in which the pulse allotting system in accordance with the invention is explained in each case by comparing it with the conventional system of pulse allotment.

EXAMPLES

1. Linear Line

Figure 2A:
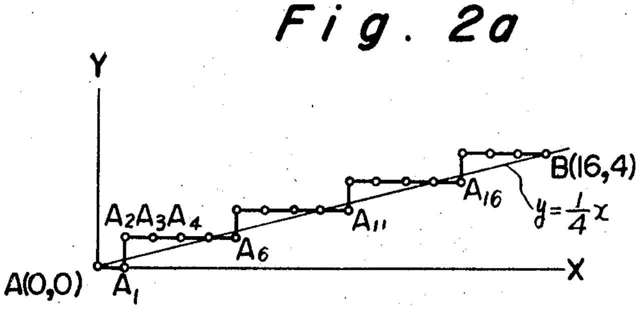
Figure 2B:
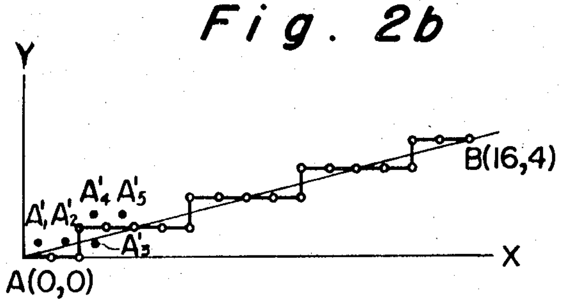
Figure 2C:
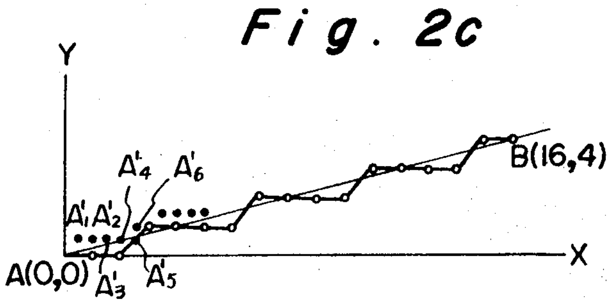

Referring now to FIG. 2, practical examples of the invention will be described in tracing a line $\overline{AB}$ from an origin A(0, 0) to a terminal point B(16, 4) by allotting the pulses. FIG. 2*a* corresponds to conventional system and FIGS. 2*b* and 2*c* correspond to the systems of the invention. A linear line passing two points A(0, 0), B(16, 4) may be expressed by the following equation.

$$16Y - 4X = 0 \quad (5)$$

This equation (5) can be expressed in differential form as (6)

$$16\, dy - 4\, dx = 0 \quad (6)$$

Figure 6:
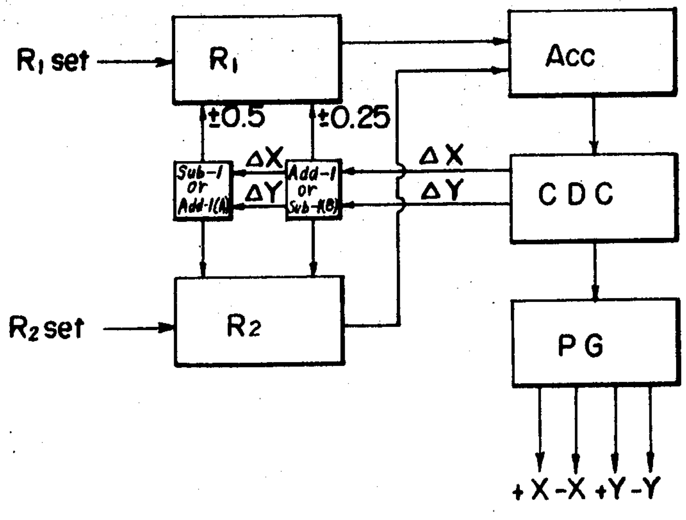
FIG. 6 is a block diagram showing the essential part of the pulse allotting equipment in accordance with the system of the invention.

In the pulse allotting system of the invention, pulse allotment is effected by a principle of analysis of the differential equation of (6) by a digital integrator which, for example, consists of registers and accumulator such as shown in FIG. 6, the details of which will be described hereinafter.

According to first embodiment of the invention, a calculation is effected to determine the direction of tracing from the origin A(0, 0). The judgement is effected at first at judging point $A_1'$ of FIG. 2*b*. This judging point having coordinate of $(x_o + \Delta x/2, y_o + \Delta y/2)$ and the judgement is effected whether the tracing curve passes above or below this point. The result of calculation is as follows:

$$\int_0^{0.5} 16dy - \int_0^{0.5} 4dx = 8 - 2 = 6 > 0 \qquad (7)$$

As the equation (7) is positive, this means the line to be traced passes below the judging point $A_1'$. In case the result of this equation is negative, the line passes above the judging point.

According to the judgement of equation (7), a pulse is allotted in direction of the X axis as shown in FIG. 2*b*. The next judgement at point $A_2'$ is effected by the calculation of next equation (8).

$$\int_0^{0.5} 16dy - \int_0^{1.5} 4dx = 8 - 6 = 2 > 0 \qquad (8)$$

By this result a further pulse is allotted in the direction of the X axis.

The judgement is continued in the same manner, and the curve is traced as shown in FIG. 2*b*, which shows considerable improvement when comparing with the conventional system of tracing shown in FIG. 2*a*.

According to another modified embodiment of the invention, at first a calculation is effected to determine the polarity of first judging point $A_1'$ of FIG. 2*c* to determine whether the tracing line passes above $A_1'$ or below it.

In the embodiment shown in FIG. 2*c*, a calculation at point $A_1'(0.5, 0.5)$ derives a result shown in following equation (9).

$$\int_0^{0.5} 16dy - \int_0^{0.5} 4dx = 8 - 2 = 6 > 0 \qquad (9)$$

This means that the result of equation (9) is positive, therefore, it also indicates the tracing line passes below point $A_1'$. On the contrary, if the result of equation (9) is negative, this means that the tracing line passes above point $A_1'$.

In accordance with this pulse allotting system of the invention, another judgement is effected at a second judging point, and then the pulse allotment is effected.

If equation (9) is positive, second judging point is selected at a point $A_2'(1.0, 0.5)$ having an ahead value of 0.5 in the X axis, and the second judgment is effected at this point.

$$\int_0^{0.5} 16dy - \int_0^{1} 4dx = 8 - 4 = 4 > 0 \qquad (10)$$

Above equation (10) shows a result of calculation at point $A_2'(1, 0.5)$. As shown above and shown in FIG. 2*c*, since the results of calculations at both of points $A_1'$ and $A_2'$ are positive, an output pulse is allotted in the direction of the X axis. This example shows both of said judgements at the points $A_1'$, $A_2'$ to be positive and the tracing line situated below the judging points. In case the result of the judgement at point $A_1'(0.5, 0.5)$ is negative, the next judging point is selected at a point $A_2'(0.5, 1)$ having an ahead value of 0.5 in the Y axis. In this case if the result of the judgement at point $A_2'$ is positive, this means the tracing line passes between the point $A_1'$ and point $A_2'$. The output pulse allotment is effected to both of the X and Y axes. In case the result of judgement at point $A_2'$ is negative, this means the tracing line passes above the judging points $A_1'$ and $A_2'$. The pulse allotment is effected in the direction of the Y axis. In the same manner, the judgement is successively effected at points $A_3'$, $A_4'$, $A_5'$, $A_6'$ ---- $A'_{n-1}$, $A'_n$, and the pulse allotment is effected as shown in FIG. 2*c*. The pulse allotting system of the invention affords a tracing of the line $\overline{AB}$ with higher accuracy than the conventional system which is shown in FIG. 2*a*. This is because, in accordance with the system of the invention, said pulse allotment is always effected based on a result of judgement at two judging points, which having co-ordinate of ahead value $$(\Delta x/2, \Delta y/2), (\Delta x, \Delta y/2) \text{ or } (\Delta x/2, \Delta y/2), (\Delta x/2, \Delta y)$$

from the tracing point.

Moreover, in accordance with this embodiment of the invention, it is possible to allot pulses both in the X and Y axes simultaneously thus providing a material improvement by decreasing the tracing time when compared with the conventional system.

2. Circular Arc

FIG. 3 shows examples of the pulse allotment of the invention when tracing a part of circle from origin A to terminal point B.

An equation representing a circle is shown in (11) and the differential form in (12).

$$x^2 + y^2 = r^2 \qquad (11)$$

$$xdx + ydy = 0 \qquad (12)$$

($r$: radius)

Figures 3A, 3C:
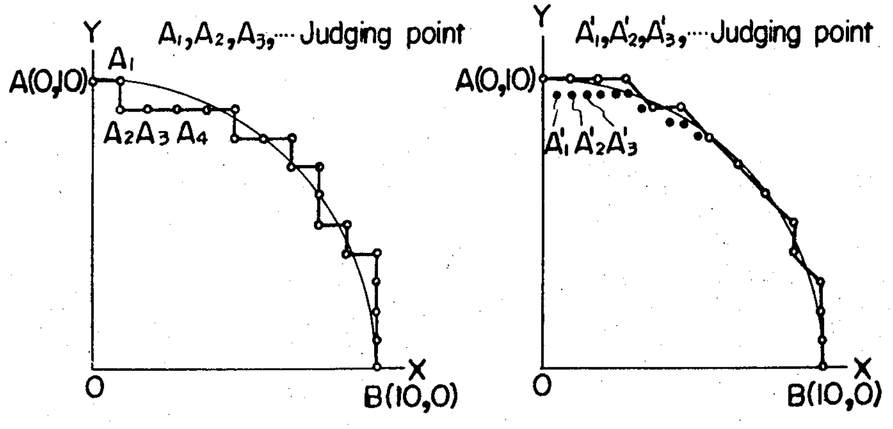
Figure 3B:
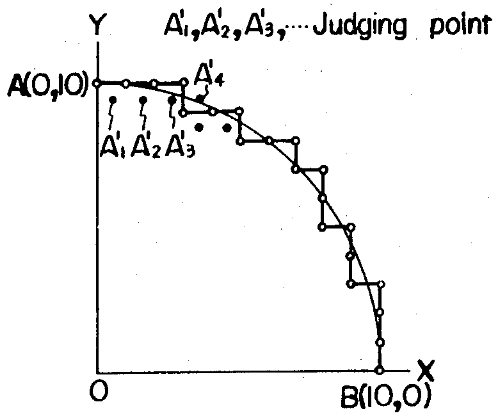

In this case also the same calculation is effected and pulses are allotted from origin A to terminal point B as is the same manner as tracing a linear line. As shown in FIGS. 3*b* and 3*c*, much improved and smoother curve tracing is effected than the conventional system shown in FIG. 3*a*.

3. A Quadratic Curve

FIG. 4 shows examples of which a quadratic curve represented by equation (13) is traced from an origin A to terminal point B. Equation (14) is a differential form of equation (13). The pulse allotment is effected in the same manner as described in the explanation of tracing a linear line (1).

$$y = (1/2)x^2 \qquad (13)$$

$$dy = xdx \qquad (14)$$

Figure 4A:
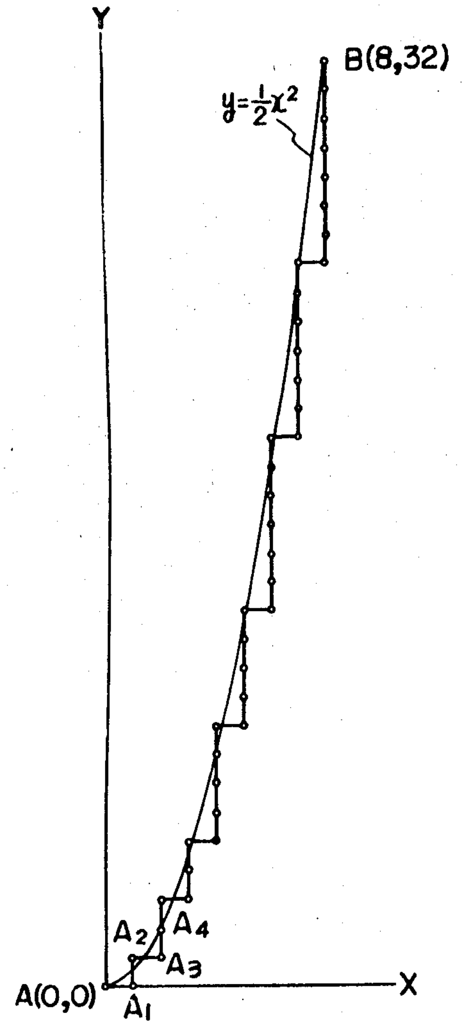
Figures 4B, 4C:
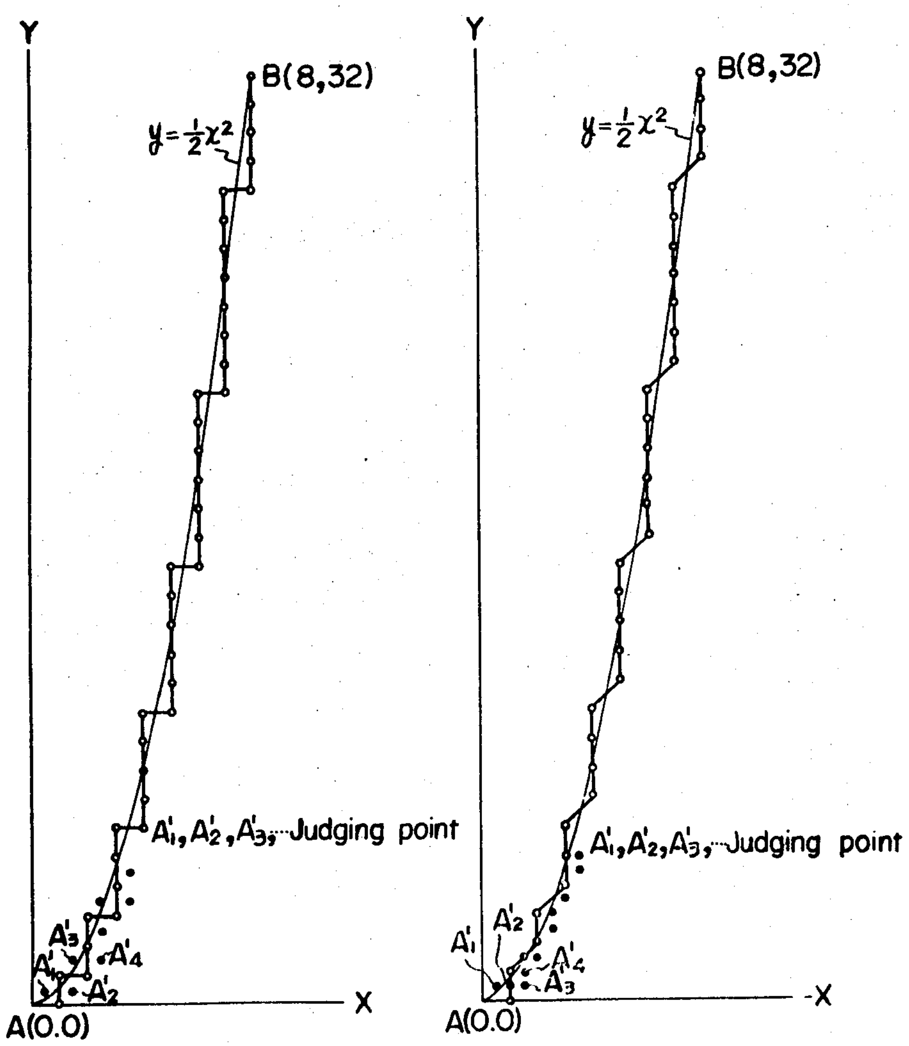

FIGS. 4*b* and 4*c* afford a material improvement when compared with the conventional system shown in FIG. 4*a*.

4. A Linear Line of 45° Angle

Figure 5A:
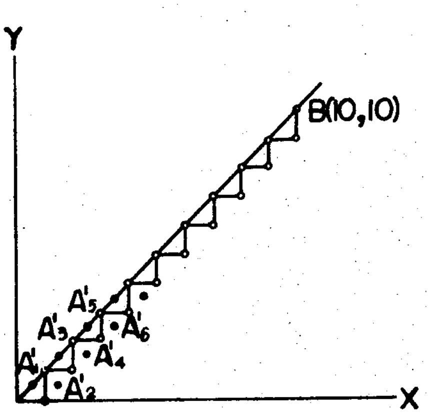
FIGS. 5*a* and 5*b* show two embodiments of the invention when tracing a linear line of 45° angle.
Figure 5B:
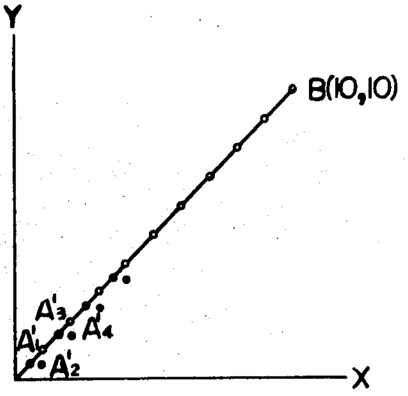

FIG. 5 shows examples of a case of tracing of linear line expressed by $x - y = 0$. As shown in FIG. 5*b* *in the modified embodiment of the present invention, it is possible to obtain an access to the terminal point B by only* 10 times of simultaneous pulse allotments in the X and Y axes. The access time of the system shown in FIG. 5*b* is just half of that of the first embodiment of the invention shown in FIG. 5*a*.

FIG. 6 is a block diagram of the equipment of the system of the invention effecting aforementioned pulse allotment for tracing lines and curves as described with referring to FIGS. 2*c*, 3*c* and 4*c*.

In the FIG. 6, $R_1$ and $R_2$ are registers each consisting of a binary electronic flip-flop register. *Acc* is an accumulating circuit constructed as a register including an addition and a subtraction circuit. The accumulating circuit *Acc* memorizes its contents once stored and makes an operation such as addition of the contents of the register $R_2$ or subtraction by the contents of the register $R_1$. The result of the operation is supplied to code discriminating circuit CDC as shown by the direction of the arrow in the block diagram. The code discriminating circuit CDC is a controlling circuit consisting of a group of flip-flop circuits. This circuit CDC discriminates the polarity of the output of circuit *Acc* as positive or negative and stores the result as discriminated. This is the code or sign of the first judging point. Then the accumulator *Acc* makes the next operation for producing the result corresponding to the co-ordinate of the second judging point. The circuit CDC when given the co-ordinate of the second judging point makes a second judgement and sends an output signal to pulse generator PG to deliver an output pulse or pulses in either of the X or Y directions or to both of the X and Y directions.

The circuit CDC also controls two operation circuits designated as Sub-1 or Add-1 (A) and Add-1 or Sub-1 (B). These circuits are of the same circuit construction and make an operation of addition or subtraction from the contents of the accumulator *Acc* under the control of circuit CDC. These addition or subtraction operations are required when tracing a circle or a quadratic curve. These circuits are controlled by a controlling circuit to make the required operation. More details of the controlling circuits will be explained by referring FIG. 7 later on.

Detailed operation of the circuit shown in FIG. 6 will be described in detail with the explanation of practical embodiment of tracing curves.

Some examples of the pulse allotting system of the invention will be described in detail with referring to FIG. 6.

1. Linear Line

In the FIG. 6, $R_1$ and $R_2$ are the registers for the memory storage of initial value. These registers are set to the initial value via the input terminals of $R_1$ set and $R_2$ set, respectively. In the present embodiment shown in FIG. 2c, a linear line having the following formula is to be traced $$16y-4x=0$$

from this formula following differential equation is obtained:

$$16\,dy-4\,dx=0$$

The present system is based on a principle of judging the polarity of value of the equation.

In this case the original point A has the co-ordinate (0, 0). Then the first judging point $A_1'$ having ahead value of $(\Delta x/2, \Delta y/2)$ is selected. In the present case as $\Delta x=\Delta y=1$, therefore $\Delta x/2=\Delta y/2=0.5$.

Thus the first judging point $A_1'$ has co-ordinates (0.5, 0.5) and therefore the first judgement is made to judge the sign of following formula:

$$\int_0^{0.5}16dy-\int_0^{0.5}4dx$$

This result is $8-2=6>0$. For making this operation, resister $R_1$ is set to initial value of 2 and register $R_2$ is set to initial value of 8. At first the contents of register $R_2$ i.e., the value of 8 is set in the accumulating circuit *Acc*, and the contents of register $R_1$ i.e., the value 2 is subtracted from the value of *Acc*. The result $R_2-R_1=8-2$ is stored in the accumulating circuit *Acc*and is judged by a code discriminating circuit CDC. In the embodiment of FIG. 2c, this result is $R_2-R_1=8-2>0$. This result corresponds to the judgement of first judging point $A_1$ (0.5, 0.5). In accordance with the second embodiment of the invention a second judging point $A_2'$ is selected. In this case as the judgement $A_1'$ is positive, $A_2'$ is selected at $(\Delta x, \Delta y/2)$, namely $A_2'$ is (1.0, 0.5). Then, further judgement at second judging point $A_2'$(1.0, 0.5) is effected, and the pulse allotment is decided based upon the result of above judgements. The latter judgement is effected in a principle of judging the polarity of the formula:

$$\int_0^{0.5}16dy-\int_0^{1}4dx$$

However, by the just preceding operation of judgement of $A_1'$ the accumulator *Acc* has a value storing as $$\int_0^{0.5}16dy-\int_0^{0.5}4dx=8-2=6$$

Therefore this time just a calculation of following formula may give same result:

$$\int_0^{0.5}16dy-\int_0^{0.5}4dx-\int_{0.5}^{1}4dx$$

The result should be $8-2-2=4>0$.

This judgement at point $A_2'$ is effected in the following simple manner. The contents of accumulating circuit *Acc* (8−2) are reduced by the contents of register $R_1$ (2) and then the sign of accumulating circuit *Acc* is discriminated. In the embodiment of FIG. 2c, as the result of judgement at point $A_2'$, namely the sign of content of accumulating circuit *Acc* (8−2−2=4>0PG is allotted in the direction of X axis.

Then the accumulated point becomes at (1.0, 0), and the next judging point $A_3'$ is selected at (1.5, 0.5). The judgement at point $A_3'$(1.5, 0.5) is effected by a principle of judging the polarity of, $$\int_0^{0.5}16dy-\int_0^{1.5}4dx$$

The operation of this judgement is effected in a very simple manner since the accumulator *Acc* has as its contents $$\int_0^{0.5}16dy-\int_0^{1}4dx$$

already.

This time the operation of $$\int_0^{0.5}16dy-\int_0^{1}4dx-\int_1^{1.5}4dx$$

gives the same result. The actual operation is effected by a subtraction of contents of register $R_1$ (2) from the contents of accumulator *Acc* (4). The result is $4-2=2>0$.

Again the result of the judgement is positive the second judging point $A_4'$ is selected at (2.0, 0.5).

The judgement of this judging point $A_4'$ is effected by subtracting the contents of register $R_1$ (2) from the present contents of the accumulator *Acc* $(4-2=2)$. The result of the operation is $$2-2=0\ \geqq 0$$

As the results of judgements at points $A_3'$ and $A_4'$ are both positive (or zero), pulse allotment is effected in X direction. Then the accumulating point has a co-ordinate of (2.0, 0).

The next judging point $A_5'$ is selected at (2.5, 0.5). The judgement is based on a principle of judging the polarity of the following formula:

$$\int_0^{0.5}16dy-\int_0^{2.5}4dx$$

The actual operation is effected by subtracting the contents of register $R_1$ (2) from the contents of the accumulator *Acc* (0). The result is $$0-2=-2<0$$

and this is negative. Therefore, the next judging point $A_6'$ is selected at a point of which co-ordinate is an ahead value of $\Delta y/2$ in the direction of Y axis. Namely, the $A_6'$ is selected at a point having co-ordinates of (2.5, 1.0). The judgement of polarity of $A_6'$ is effected as a principle of judging the value of following equation:

$$\int_0^{1}16dy-\int_0^{2.5}4dx=16-10=6$$

The accumulator *Acc* stores the previous calculation, namely, the result of, $$\int_0^{0.5} 16dy - \int_0^{2.5} 4dx = 8 - 10 = -2$$

Therefore the operation is effected by adding the contents of register $R_2$ (8) to the content of accumulator *Acc* (−2), which operations based on the following principle:

$$\int_0^{1} 16dy - \int_0^{2.5} 4dx = \int_0^{0.5} 16dy + \int_{0.5}^{1.0} 16dy - \int_0^{2.5} 4dx$$

The actual operation is $$-2 + 8 = 6$$

As the result of this second judgement is positive, the negative and positive condition as explained before applies. Accordingly, a pulse is allotted in X direction and also another pulse is allotted in Y direction simultaneously. The tracing is effected in an oblique line of 45° as shown in FIG. 2*c*, and the tracing point has a co-ordinate (3.0, 1.0).

Then in the next judgement a first judging point is selected at $A_7'$(3.5, 1.5). As the result of previous operation, the accumulator *Acc* has its contents $$\int_0^{1} 16dy - \int_0^{2.5} 4dx = 6$$

already.

The desired operation of the following formula:

$$\int_0^{1.5} 16dy - \int_0^{3.5} 4dx$$

is effected by the principle of calculation of the following equation:

$$\int_0^{1} 16dy - \int_0^{2.5} 4dx + \int_1^{1.5} 16dy - \int_{2.5}^{3.0} 4dx - \int_{3.0}^{3.5} 4dx$$

Namely, for the actual operation the contents of register $R_2$ (8) is added and the contents of register $R_1$ (2) is subtracted twice. The result is 6 + 8 − 2 − 2 = 10.

As the result is positive the second judging point $A_8'$ is selected at (4.0, 1.5), and by subtracting the contents of register $R_1$ (2) from the contents of accumulator *Acc* which is now a value of 10, the polarity of $A_8'$ is judged. The result is 10 − 2 = 8 > 0, and the judgements of two judging points are positive-positive and, therefore, the pulse is allotted in X direction. As can be understood in the previous description, all the calculating operations are effected by simple addition or subtraction of the contents of register $R_2$ or register $R_1$ with the contents of accumulator *Acc*. The registers $R_1$ and $R_2$ have no need to change their contents after the initial values are once set. Therefore the system of the invention affords a merit of high accuracy, while using a very simple operation unit.

The principle of allotment of pulses has been described with respect to FIG. 6. The more detailed operation of the pulse allotting equipment according to the present invention will now be explained referring to FIG. 7. The pulse allotment of tracing a linear line in the second embodiment of the present invention as shown in FIG. 2*c* will be explained.

Figure 7:
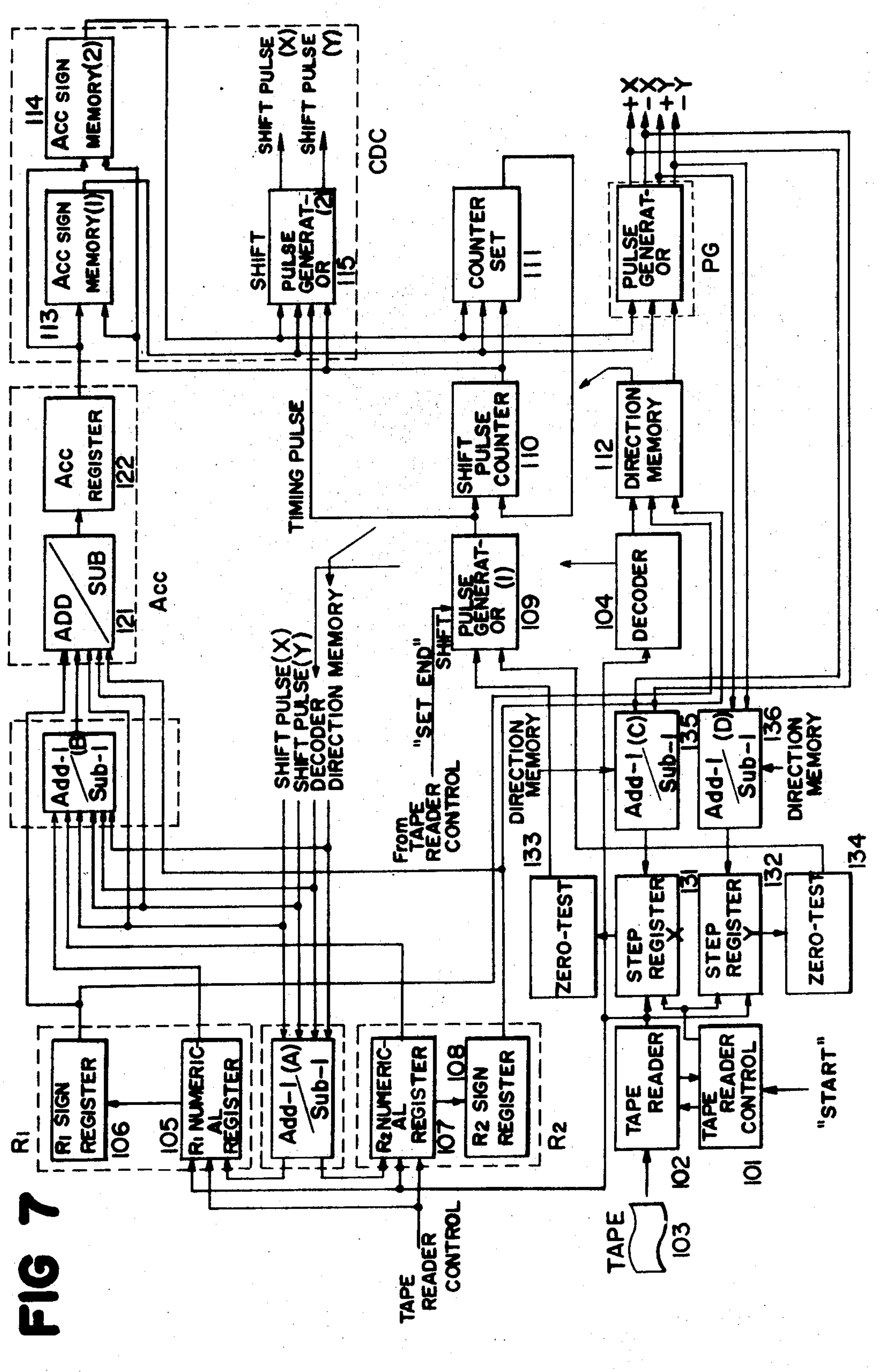
FIG. 7 is a block diagram showing more details of the pulse allotting equipment of the invention as basically shown in FIG. 6.

FIG. 7 shows more details of the system of the invention, in which the elements shown by dotted line such as registers $R_1$, $R_2$ accumulating circuit *Acc*, code discriminating circuit CDC and pulse generator PG correspond to the elements shown by same references in FIG. 6.

This system operates under control of an instructive information given by an input tape as same as an ordinary numerical controlling systems.

Figure 8A:
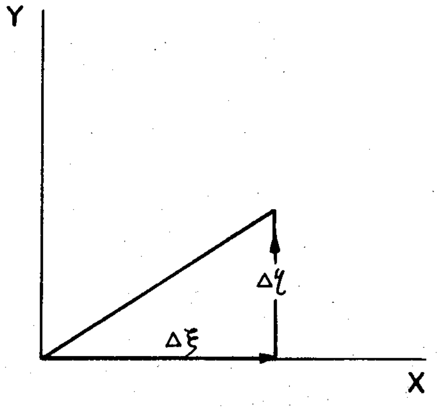
FIGS. 8*a*, 8*b*, and 8*c* are diagrams illustrating the operation of the equipment shown in FIG. 7 in conjunction with the tracing of a linear line, a circle and a quadratic curve, respectively.

There are various formats in the actual information form of the input tape of such numerical controlling systems, but basically an instruction representing for tracing of a linear line and for the distance between the starting point and the end point, i.e., ($\Delta\xi$,$\Delta\nu$) should be given as the input information from the input tape for tracing a linear line. This input information is shown in FIG. 8*a*. In the present example shown in FIG. 2*c* $\Delta\xi$=16 and $\Delta\nu$=4.

By applying an instruction signal marked as "START" to tape reader control circuit 101, a tape reader 102 reads the information contained in the input tape 103. The instruction representing a linear line is applied to a decoder 104 and is decoded therein. The numerical values $\Delta\xi$=16, $\Delta\nu$=4 are read by the reader 102 and the values $\Delta\xi/2 = 8$, $\Delta\nu/2 = 2$ are set in the registers $R_2$ and $R_1$, respectively. Actually these values are set in $R_1$ numerical register 105 and $R_2$ numerical register 107 and the signs thereof are set in the sign registers 106 and 108.

At the completion of the setting of the tape information into the registers $R_1$ and $R_2$ by the tape reader control circuit 101, a signal representing the completion of setting, i.e., "SET END" signal, is sent to shift pulse generator-(1) 109. The shift pulse generator-(1) 109, shift pulse counter 110 and counter set 111 consist a timing generating part for controlling the pulse allotment.

The shift pulse generator-(1) 109 produces reference timing pulses by an instruction of the SET END signal. By the control of the reference timing pulses the shift pulse counter 110 counts as 0, 1, 2, 3, 0, 1, 2, 3, 0, 1, ..., cyclically.

This shift pulse counter 110 is set to "1" by the counter circuit 111, when the shift pulse counter 110 counts pulse "3" and when both of the *Acc* sign memories (1) 113, and (2) 114 included in circuit CDC attain the same signs. *Acc* sign memory (1) 113 sets *Acc* sign at the time when the shift pulse counter 110 counts "1" and "2", and *Acc* sign memory (2) 114 sets *Acc* sign at the times when the shift pulse counter 110 counts "3" and "0".

By the contents of *Acc* sign memories (1) 113 and (2) 114, and that of the shift pulse counter 110 a judging point is given in a manner explained with respect to FIGS. 1*a*, 1*b*, 1*c* and 1*d*, and a shift pulse (X) or a shift pulse (Y) is produced from shift pulse generator (2) 115.

The relations between the shift pulses (X) and (Y) and the contents of shift pulse counter 110 and *Acc* sign memories (1) 113, (2) 114 are shown below.

| Content of shift pulse counter 110 | |
|---|---|
| 0 | Shift pulse (Y). |
| 1, 2 | Acc sign memory (1)≧0: Shift pulse (X).<br>Acc sign memory (1)<0: Shift pulse (Y). |
| 3 | Acc sign memory (2)≧0: Shift pulse (X).<br>Acc sign memory (2)<0: Shift pulse (Y). |

At the beginning, the shift pulse counter 110 has content 0. At this time under control of a program a shift pulse (Y) is produced by a timing pulse and the shift pulse counter 110 is set to a value 1. At first, content of register $R_2$, which in this case is a numerical value 8, is added via ADD/SUB circuit 121 into *Acc* register 122. Thus, the content of the *Acc* register 122 becomes value 8, and *Acc* sign memory (1) 113 becomes positive. Then by a succeeding timing pulse, a shift pulse (X) is produced and the shift pulse counter 110 counts value 2.

By the shift pulse (X), content of the register $R_1$ is subtracted from the content of *Acc* register 122 through ADD/SUB circuit 121. The result is 8 − 2 = 6 > 0. In this time, *Acc* sign memory (1) 113 remains as positive. This corresponds to the judging point $A_1'$ of FIG. 2*c*. Then, by the succeeding timing pulse, shift pulse (X) is produced and the shift pulse counter 110 becomes value 3. Then, the content of register $R_1$ is subtracted from the content of *Acc* register 122, which becomes now 6 − 2 = 4 > 0 representing judging point $A_2'$ in FIG. 2*c*. Accordingly, *Acc* sign memory (2) 113 becomes as positive.

The pulse generator PG produces a drive pulse either one of ±X or ±Y, at the time when the shift pulse counter 110 counts 3 and according to the contents of the direction memory 112 and that of the *Acc* sign memories (1) 113 and (2) 114, as explained before with respect to FIG. 1. This allotment is effected in the following manner.

Both the *Acc* sign memories (1) 113 and (2) 114 are positive: +X (or −X)

Both the *Acc* sign memories (1) 113 and (2) 114 are negative: +Y (or −Y)

*Acc* sign memory (1) 113 has different sign from that of (2) 114: +X (or −X) and +Y (or −Y).

In the above allotment, the sign in each direction is decided by the corresponding sign of $\Delta x$, $\Delta y$ in the direction memory 112.

In case shown in FIG. 2*c*, the direction memory 112 gives $\Delta x > 0$ and $\Delta y > 0$, and the contents of the *Acc* sign memories (1) 113 and (2) 114 are positive, a drive pulse +X is produced. Moreover, in this case, since the content of the shift pulse counter 110 is 3 and both the *Acc* sign memories (1) 113 and (2) 114 are positive, the shift pulse counter 110 is set to 1 by the counter set circuit 111. Accordingly, the shift pulse counter 110 becomes 2 by the next timing pulse, and a shift pulse (X) is produced.

Then the content of register $R_1$ is subtracted from *Acc* register 122 via ADD/SUB circuit 121, and the content becomes $4-2=2>0$. The *Acc* sign memory (1) 113 now memorizes as positive. This corresponds to the judging point $A_3'$ in FIG. 2*c*.

By the succeeding timing pulse, the shift pulse counter 110 becomes 3, and a shift pulse (X) is produced. Then the content of register $R_1$ is subtracted from the *Acc* register 122, and the content becomes $2-2=0 \geqq 0$, and the *Acc* sign memory (2) 114 memorizes positive. This corresponds to the judging point $A_4'$ in FIG. 2*c*.

Then, since the shift pulse counter 110 is 3 and the *Acc* sign memories (1) 113 and (2) 114 are both positive, the shift pulse counter 110 is set to 1 by an operation of the counter set circuit 111.

By the next timing pulse, a shift pulse (X) is produced, and the content of the register $R_1$, which in this case 2, is subtracted from the *Acc* register 122. Then the content of the *Acc* register 122 becomes $0-2=-2<0$, and the sign of *Acc* sign memory (1) 113 becomes negative. This corresponds to the judging point $A_5'$ in FIG. 2*c*. Accordingly, by the next timing pulse a shift pulse (Y) is produced and the content of register $R_2$, which is 8, is added to the *Acc* register 122 via ADD/SUB circuit 121. The content of the *Acc* register now becomes $-2+8=6>0$, and the *Acc* sign memory (2) memorizes positive. This represents the judgement at judging point $A_6'$ in FIG. 2*c*. Since the *Acc* sign memory (1) 113 is negative and the *Acc* sign memory (2) 114 is positive, two drive pulses +X and +Y are produced simultaneously. Then by the succeeding timing pulse a shift pulse (X) is produced, and the content of the *Acc* register 122 is subtracted by the content of register $R_1$, which is 2. Thus the *Acc* register 122 becomes $6-2=4>0$, and the shift pulse counter 110 becomes 0.

By repeating the above operations a given linear line is traced.

When reading the tape information by the tape reader 102, the value of $\Delta\xi$ is set in the step register X 131 and $\Delta\eta$ is set in the step register Y 132. These step registers 131 and 132 are subtracted by value 1 at each time corresponding to each one step of the generation of the driving pulses. By making zero test of the content of these step registers 131 and 132, it is possible to stop the driving pulses at the end point B shown in FIG. 2*c*, by means of stopping the delivery of timing pulses from the shift pulse generator (1) 109 at the time when the contents of the both step registers become as 0.

In summary, in accordance with the system of the invention, pulse allotment is continued in the same manner. The judging point is taken at two points, of first and second judging points. If the result is positive-positive the output pulse is allotted in the direction of the X axis. If the result is positive-negative or negative-positive the output pulse is allotted in both of the X and Y axes. If the result is negative-negative an output pulse is allotted in the direction of the Y axis.

2. Circular Arc

The operation will be described with reference to FIG. 3*c* in which a circular arc is to be traced.

The initial value is set in register $R_1$ as 0 and $R_2$ as 10 respectively. In this case the sign of $\Delta x, \Delta y$ is determined by said initial value and tracing direction.

In general, the equation of a circle is expressed by the following formula $$f(x, y) = r^2 - x^2 - y^2 = 0$$

wherein $r$ is the radius of the circle. The above judgement is effected by making a calculation of $$f(x_1, y_1) - f(x, y)$$

wherein $x_1$ and $y_1$ are the co-ordinates of the judging points. Therefore, the judgement is effected basically to discriminate the polarity of following formula:

$$\begin{aligned} f(x_1, y_1)-f(x, y) &= -x_1^2-y_1^2+r^2+x^2+y^2-r^2 \\ &= -x_1^2+x^2-y_1^2+y^2 \\ &= -(x_1-x)(x_1+x)-(y_1-y)(y_1+y) \end{aligned}$$

In the above equation, $x_1-x$ corresponds to $\Delta x/2$, or in the present case corresponds to a value of 0.5, since the first judging point has ordinate $x_1$ or 0.5.

$$x_1 - x = \Delta x/2 = 0.5$$

from this equation $x = x_1 - \Delta x/2$.

By introducing above value of $x$ into $(x_1+x)$ $$x_1 + x = 2x - \Delta x/2.$$

Therefore, $$\begin{aligned} (x_1-x)(x_1+x) &= \frac{\Delta x}{2}\left(2x_1-\frac{\Delta x}{2}\right) \\ &= \frac{\Delta x}{2}2x_1-\frac{\Delta x^2}{4} \\ &= 0.5\times 2x_1-0.5\times 0.5 \\ &= x_1-0.25 \end{aligned}$$

In the same manner $$-(y_1-y)(y_1+y) = -(\Delta y/2)(2y_1-(\Delta y/2)) = -\Delta y y_1 + \Delta y^2/4$$

In case of FIG. 3*c*, $\Delta y = -1$, therefore, by introducing this value into above equation, $$-(y_1-y)(y_1+y) = y_1 + 1/4 = y_1 + 0.25$$

When considering a judgement at judging point $A_1'$ having coordinates (0.5, 9.5), an addition or a subtraction of value $\Delta x/2 = 0.5$ from the value of register $R_1$, i.e., from 0, and that of register $R_2$, i.e., 10, are made by using sub-1 or add-1 (A) circuit. The contents of these registers $R_1$ and $R_2$ become the same as the co-ordinates of the first judging point.

But for making the above judgement in the first judging point $A_1'$, an amount of 0.25 is to be added to the contents of accumulator *Acc* while subtracting the contents of $R_1$, i.e., 0.5 from the contents of accumulator *Acc*. For this purpose add-1 or sub-1 circuit (B) is provided. This circuit (B) makes an addition of 0.25 to the value of accumulator *Acc* when the contents of $R_1$ is subtracted from that of the accumulator *Acc*. This circuit (B) does not have any influence on the contents of the registers $R_1$ or $R_2$. In the same manner, when the contents of register $R_2$ is added to the contents of accumulator *Acc* the value 0.25 is added from the contents of *Acc*.

Thus, the contents of *Acc* is:

$$\begin{aligned} f(0.5, 9.5) &= (9.5+0.25)-(0.5-0.25) \\ &= 9.5 > 0 \end{aligned}$$

Then the second judging point $A_2'$ is selected at a point having co-ordinate (1.0, 9.5). For this second judgement, the result is:

$$f(1.0, 9.5) = 9.5 - 1.0 + 0.25 = 8.75 > 0$$

and the sign of *Acc* is discriminated as positive.

In this example, the content of accumulating circuit *Acc* is zero at judging point $A_1'$ and also at $A_2'$ in FIG. 3*c*, a driving pulse +X is produced from the pulse generator PG.

Then third judging point $A_3'$ is selected at point having co-ordinate (1.5, 9.5). The result of the judgement at this point is $f(1.5, 9.5) = 8.75 - (1.5 - 0.25) = 7.50 > 0$. Therefore, the sign of accumulating circuit *Acc* becomes positive and fourth judging point $A_4'$ is selected at point having coordinate (2.0, 9.5).

For this judgement accumulating circuit *Acc* makes following operation $f(2.0, 9.5) = 7.50 - 2.0 + 0.25 = 5.75 > 0$. Since the results of judgement at both points $A_3'$ and $A_4'$ are positive a driving pulse of +X is produced from the pulse generator PG.

The calculating operation is carried on in the same manner and the circle shown in FIG. 3*c* may be traced.

More detailed operation of the system of the invention for the pulse allotment of FIG. 3*c* will be described by referring to FIG. 7.

Figure 8B:
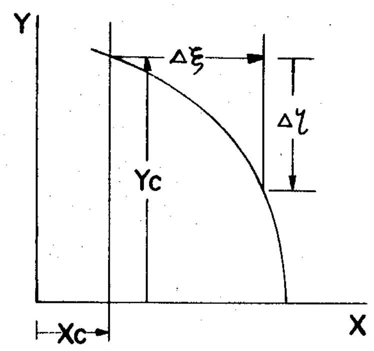

There are various types of the formats used in the input tape, but for tracing a circle at least an instruction indicating a circle and the direction of rotation, an instruction containing information of distances in the co-ordinates between a starting point to an end point ($\Delta\xi, \Delta\nu$) and an information of co-ordinate of the starting point (*Xc*, *Yc*) viewed from the center of the circle (0, 0). The values $\Delta\xi$, $\Delta\nu$, *Xc* and *Yc* are shown in FIG. 8*b*.

In the example, shown in FIG. 3*c*, $\Delta\xi=10$, $\Delta\nu=-10$, $Xc=0$ and $Yc=10$.

At first tape reader 102 reads out the information on tape 103 under control of the tape reader control circuit 101. The information representing a clockwise rotating circle is decoded by the decoder 104 and the information representing that $\Delta x>0$ and $\Delta y<0$ is memorized in the direction memory 112. $\Delta\xi=10$ and $\Delta\nu=-10$ are recorded in X and Y step registers 131 and 132, respectively. $Xc=0$ is set in the register $R_1$ and $Yc=10$ is set in the register $R_2$. Then a SET END signal is sent from the tape reader control 101 to shift pulse generator (1) 109. The generator 109 delivers timing pulses and shift pulse generator (2) 115 is controlled therefrom. At first a shift pulse (Y) is produced. By this time, the decoded information in the decoder 104 representing a circle and that in the direction memory 112 act to operate Add-1/Sub-1 (A) and the content of register $R_2$ (10) is subtracted by 0.5, i.e., $10 - 0.5 = 9.5$. This content of register $R_2$ (9.5) is added to the accumulating circuit *Acc* via Add-1/Sub-1 (B) circuit. When passing the Add-1/Sub-1 (B) circuit a value 0.25 is added to the content of register $R_2$. Therefore the content of *Acc* register 122 now becomes $9.5 + 0.25 = 9.75$. In this case count of shift pulse counter 110 is 1 and *Acc* sign memory (1) 113 is positive, a shift pulse +X is produced at the next timing pulse and the shift pulse counter becomes 2. Then content of register $R_1$ (0) is added by 0.5 by Add-1/Sub-1 (A) circuit. This content is subtracted by 0.25 by Add-1/Sub-1 (B), and the content of accumulating register *Acc* is subtracted by the above result. Therefore the content of accumulating circuit *Acc* is.

$$9.75 - (0 + 0.5 - 0.25) = 9.5 > 0$$

The *Acc* sign memory (1) 113 is positive. This corresponds to the judging point $A_1'$ in FIG. 3*c*. Since the shift pulse counter 110 is 2 and *Acc* sign memory (1) 113 is positive, a shift pulse +X is produced by the next timing pulse and the shift pulse counter 110 becomes 3.

Then the content of register $R_1$ (0.5) is added by 0.5 by Add-1/Sub-1 (A). This resultant content is subtracted by 0.25 by the Add-1/Sub-1 (B) circuit and the result is subtracted from the content of the accumulating circuit *Acc*.

Then the content of *Acc* register 122 is $$9.5 - (0.5 + 0.5 - 0.25) = 8.75 > 0.$$

This corresponds to judging point $A_2'$ in FIG. 3*c*.

Then, since the shift pulse counter is 3 and both the accumulating memories (1) and (2) 113, 114 are positive the pulse generator PG generates a driving pulse +X.

Then the shift pulse counter 110 is set to 1, since both the *Acc* sign memories (1) 113 and (2) 114 have same signs. By the next timing pulse a shift pulse +X is produced. By the contents of register $R_1$, Add-1/Sub-1 (A) circuit, the content of *Acc* register 122 now becomes $$8.75 - (1 + 0.5 - 0.25) = 7.50 > 0$$

*Acc* sign memory (1) 113 becomes positive. This judgement corresponds to judging point $A_3'$ in FIG. 3*c*.

Accordingly, by the next timing pulse a shift pulse +X is delivered, and shift pulse counter 110 becomes 3. Then by the contents of register $R_1$ and of Add-1/Sub-1 (A) and Add-1/Sub-1 (B) circuits, the content of *Acc* register 122 becomes $$7.5 - (1.5 + 0.5 - 0.25) = 5.75 > 0.$$

This operation is the judgement at judging point $A_4'$ in FIG. 3*c*. In this case, since the contents of *Acc* sign memories (1) 113 and (2) 114 are both positive, a driving pulse of +X is produced from pulse generator PG.

By repeating the same operation the given circle is traced.

3. A Quadratic Curve

The pulse allotting system in tracing a quadratic curve in FIG. 4*c*, which is parabolic curve in this example, will now be explained.

Figure 8C:
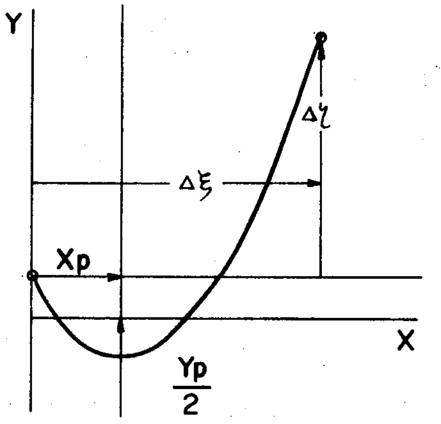

More general form of a parabolic curve is shown in FIG. 8*c*. In this figure, $yp/2$ is a distance between the apex and the focus of the parabolic curve and $Xp$ is a distance between the starting point to the axis of the parabolic curve.

The parabolic curve may be expressed in general by the following formula.

$$2Y_p y = x^2 - 2X_p x.$$

For the parabolic curve shown in FIG. 8*c*, the following equation may be applied as the equation (3) of the invention.

$$f(x, y) = 2Y_p y - x^2 + 2X_p x.$$

The judgement of the invention is made by calculating the following formula $$f(x_1, y_1) - f(x, y)$$

wherein $x_1$ and $y_1$ are co-ordinates of judging point. Actually the judgement is effected by discriminating the polarity of following formula.

$$f(x_1, y_1) - f(x, y)$$
$$= 2y_p y_1 - x_1^2 + 2X_p x_1 - (2Y_p y - x^2 + 2X_p x)$$
$$= 2Y_p(y_1 - y) - \{(x_1^2 - x^2) - 2X_p(x_1 - x)\}$$

In case of FIG. 3*c*

$$y_1 - y = \Delta y/2$$
$$x_1 - x = \Delta x/2$$

Therefore, $$2Y_p(y_1 - y) = 2Y_p \Delta y/2 = Y_p \Delta y \text{ and}$$

$$(x_1^2 - x^2) - 2X_p(x_1 - x) = (x_1 - x)(x_1 + x) - 2X_p(x_1 - x)$$
$$= \frac{\Delta x}{2}\left(2x_1 - \frac{\Delta x}{2}\right) - 2X_p\frac{\Delta x}{2}$$
$$= \Delta x\left(x_1 - \frac{\Delta x}{4}\right) = X_p \Delta x$$
$$= \Delta x\left(-X_p + x_1 - \frac{\Delta x}{4}\right)$$

In the example, shown in FIG. 4*c*

$$\Delta x/2 = 0.5 \qquad \Delta y/2 = 0.5.$$

In the practical block diagram shown in FIG. 7, at first the instruction on tape 103 is read by tape reader 102. Then register $R_1$ is set by a value $-Xp$ and register $R_2$ is set by value $Yp$. In case of FIG. 4*c*, $$f(x, y) = 2y - x^2 \qquad Xp = 0 \qquad Yp = 1.$$

Therefore, 0 and 1 are set in registers $R_1$ and $R_2$, respectively.

Generally the operation of register $R_2$ is effected in the same manner as tracing a linear line at the time of delivery of shift pulse (Y), but the operation of register $R_1$ is effected in a manner same as tracing a circle as described before, and the content of register $R_1$ is subtracted from *Acc* register 122 by the aid of Add-1/Sub-1 (A) and (B) circuits. This subtraction is effected as the following equation $$\Delta x(-Xp + x_1 - \Delta x/4).$$

At the completion of the set of the registers $R_1$ and $R_2$, shift pulse (Y) is produced and the content of register $R_2$ is added to *Acc* register 122, which now becomes 1 and the *Acc* sign memory (1) 113 becomes positive.

Then by the next timing pulse a shift pulse (X) is produced, and the shift pulse counter 110 counts 2. The content of register $R_1$ is added by 0.5 by means of Add-1/Sub-1 (A) circuit. Then the result is subtracted by 0.25 by means of Add-1/Sub-1 (B) circuit and the content of *Acc* register is subtracted by the result. Namely, following operation is effected at *Acc* register 122

$$1-(0.5-0.25)=0.75>0.$$

This is the judgement at judging point $A_1'$ in FIG. 4*c*. *Acc* sign memory (1) 113 remains as positive.

At the next timing pulse shift pulse (X) is produced, and the shift pulse counter 110 becomes 3.

The next judgement is effected by register $R_1$ and Add-1/Sub-1 (A) and (B) circuits.

The content of *Acc* register 122 becomes $$0.75-(0.5+0.5-0.25)=0 \geq 0.$$

By this operation *Acc* sign memory (2) 114 becomes positive. Since both the *Acc* sign memory (1) and (2) circuits 113 and 114 are positive, a driving pulse +X is delivered from the pulse generator PG.

Continuing the same operation the given parabolic curve is traced.

As can be seen by the foregoing explanation, all the judging operations of the system at all of the judging points consist of simple addition or subtraction operation, while the initial contents of registers $R_1$ and $R_2$ are kept constant during the whole progress of the series of operations. Accordingly, the system of the present invention affords a great advantage for the simplification of the operational logics.

Although the examples of this invention have been explained in the foregoing in the case of a system of pulse allotment for a line or curves according to the second embodiment of the invention, namely, as shown in FIGS. 2*c*, 3*c* and 4*c*, the examples of tracing shown in FIGS. 2*b*, 3*b* and 4*b* can very easily be understood, since in these cases only the initial judging point is considered.

As explained before, the pulse allotting system of the invention affords a great improvement in tracing a given curve in the more close approximation of tracing, and at the same time achieves a certain reduction of tracing time.

What is claimed is:

1. Pulse allotting system of curve tracing equipment, wherein a curve is traced by allotting pulses having components along the X and Y axes and accumulating the thus allotted pulses from an initial value, comprising:

selecting means to add $\Delta x/2, \Delta y/2$ increments to said initial value or the accumulated point therefrom to select a judging point having co-ordinates displaced by ($\Delta x/2, \Delta y/2$) from said initial value or the accumulated point therefrom, judging means responsive to said selecting means for effecting a judgement as to whether said judging point is situated in a positive region or a negative region of the curve to be traced, and pulse allotting means responsive to said judgement means to effect allotment of a pulse in either the X axis or the Y axis based upon the judgement at said judging point whether the judging point is situated in a positive region or a negative region of the curve to be traced.

2. Pulse allotting system of curve tracing equipment as recited in claim 1 wherein said selecting means comprises first and second storage registers for storing numbers required for executing a logical operation for tracing a given curve and supplied from an external program, the numbers being proportional to the *x* and *y* distances between the starting point and the end point of the curve to be traced when the curve is a linear line, the numbers being initially numbers representing the coordinates of the starting point and then successively numbers representing coordinates of the judging points when the curve is a circular arc, and an accumulating register connected to said first and second storage registers and responsive to said judging means for adding the contents of one of said storage registers to the contents of said accumulating register or subtracting the contents of the other of said storage registers from the contents of said accumulating register based upon the judgement at said judging point whether the judging point is situated in a positive region or a negative region of the curve to be traced.

3. Pulse allotting system of curve tracing equipment as recited in claim 2 wherein said judging means comprises code discriminating circuit means for detecting the polarity of the contents of said accumulating register and providing an output indicative of whether said judging point is situated in a positive region or a negative region of the curve to be traced.

4. Pulse allotting system of curve tracing equipment as recited in claim 3 wherein said code discriminating circuit means comprises an accumulating register sign memory for temporarily memorizing the sign of the contents of said accumulating register, and shift pulse generator means responsive to said accumulating register sign memory for generating control pulses which control whether the contents of one of said storage registers is added to the contents of said accumulating register or the contents of the other of said storage registers is subtracted from the contents of said accumulating register.

5. Pulse allotting system of curve tracing equipment as recited in claim 4 wherein said accumulating register comprises a register for accumulating an algebraic sum during the course of the tracing of said curve, and add/subtract means connected to said register and adapted to receive as inputs the contents of said first and second storage registers, said add/subtract means being responsive to said control pulses generated by said shift pulse generator means to add the contents of one of said storage registers to the contents of said register or to subtract the contents of the other of said storage registers from the contents of said register.

6. Pulse allotting system of curve tracing equipment as recited in claim 4 wherein said pulse allotting means comprises a pulse generator responsive to said accumulating register sign memory to generate a pulse in either the X axis or the Y axis depending on the polarity of the contents of said accumulating register.

7. Pulse allotting system of curve tracing equipment as recited in claim 4 further comprising timing means for generating a series of timing pulses, said accumulating register sign memory and said shift pulse generator means being responsive to said timing pulses for cyclically causing a new judging point to be selected and thereafter effecting a judgement as to whether said new judging point is situated in a positive region or a negative region of the curve to be traced.

8. Pulse allotting system of curve tracing equipment, wherein a curve is traced by allotting pulses having components along the X and Y axes and accumulating the thus allotted pulses from an initial value, comprising:

selecting means cyclically operable to select a first judging point having co-ordinates displaced by ($\Delta x/2, \Delta y/2$) from said initial value or the accumulated points therefrom, judging means responsive to said selecting means for effecting a first judgement as to whether said first judging point is situated in a positive region or a negative region of the curve to be traced, said selecting means being responsive to said first judgement to select a second judging point having coordinates displaced by either ($\Delta x, \Delta y/2$) or ($\Delta x/2, \Delta y$) from said initial value or the accumulated point according to the result of said first judgement, said judging means being thereafter responsive to said selecting means for effecting a second judgement as to whether said second judging point is situated in a positive region or a negative region of the curve to be traced, and pulse allotting means responsive to said judging means to effect allotment of a pulse in either the X axis or the Y axis or a pulse in both of the X and Y axes based upon the judgement at said first and second judging points whether these judging points are both situated in a positive region or both in a negative region of the curve to be traced or each of these judging points is situated in positive and negative regions respectively with respect to the curve to be traced.

9. Pulse allotting system of curve tracing equipment as recited in claim 8 wherein said selecting means comprises first and second storage registers for storing numbers required for executing a logical operation for tracing a given curve and supplied from an external program, the numbers being proportional to the $x$ and $y$ distances between the starting point and the end point of the curve to be traced when the curve is a linear line, the numbers being initially numbers representing the coordinates of the starting point and then successively numbers representing coordinates of the judging points when the curve is a circular arc, and an accumulating register connected to said first and second storage registers and responsive to said judging means for adding the contents of one of said storage registers to the contents of said accumulating register or subtracting the contents of the other of said storage registers from the contents of said accumulating register based first upon said first judgement and then upon said second judgement in a cyclical manner.

10. Pulse allotting system of curve tracing equipment as recited in claim 9 wherein said judging means comprises code discriminating circuit means for detecting the polarity of the contents of said accumulating register and providing outputs indicative of whether said first and second judging points are situated in a positive region or a negative region of the curve to be traced.

11. Pulse allotting system of curve tracing equipment as recited in claim 10 wherein said code discriminating circuit means comprises first accumulating register sign memory for temporarily memorizing the sign of the contents of said accumulating register after the selection of said first judging point, second accumulating register sign memory for temporarily memorizing the sign of the contents of said accumulating register after the selection of said second judging point, and shift pulse generator means responsive to said first and second accumulating register sign memories for generating control pulses which control whether the contents of one of said storage registers is added to the contents of said accumulating register or the contents of the other of said storage registers is subtracted from the contents of said accumulating register after each of said first and second judgements.

12. Pulse allotting system of curve tracing equipment as recited in claim 11 wherein said accumulating register comprises a register for accumulating an algebraic sum during the course of the tracing of said curve, and add/subtract means connected to said register and adapted to receive as inputs the contents of said first and second storage registers, said add/subtract means being responsive to said control pulses generated by said shift pulse generator means to add the contents of one of said storage registers to the contents of said register or to substract the contents of the other of said storage registers from the contents of said register.

13. Pulse allotting system of curve tracing equipment as recited in claim 11 wherein said pulse allotting means comprises a pulse generator responsive to said first and second accumulating register sign memories to generate after each second judgement is effected a pulse in either the X axis or the Y axis or a pulse in both the X and the Y axes depending on the polarities of the contents of said accumulating register after the selections of said first and second judging points.

14. Pulse allotting system of curve tracing equipment as recited in claim 11 further comprising timing means for generating a series of timing pulses, said first and second accumulating register sign memories and said shift pulse generator means being responsive to said timing pulses for cyclically causing new first and second judging points to be selected and thereafter effecting first and second judgements as to whether said new first and second judging points are situated in a positive or a negative region of the curve to be traced.

15. Pulse allotting system of curve tracing equipment as recited in claim 14 wherein said timing means comprises second shift pulse generator means for generating a continuous series of pulses in response to an input signal, and shift pulse counter means for counting in a cyclical manner said continuous series of pulses to produce said series of timing pulses.

16. Pulse allotting system of curve tracing equipment as recited in claim 15 wherein said shift pulse counter means comprises a shift pulse counter connected to receive said continuous series of pulses, and counter set means responsive to said first and second accumulating register sign memories and the contents of said shift pulse counter for resetting said shift pulse counter to a first predetermined count when the signs memorized by said first and second accumulating register sign memories are of the same polarity and said shift pulse counter has attained a second predetermined count.

17. Pulse allotting system of curve tracing equipment as recited in claim 14 wherein said first and second storage registers each comprise a numerical register and a sign register, said timing means including second shift pulse generator means for generating a continuous series of pulses in response to an input signal, said system further comprising direction controlling means responsive to said sign registers of said first and second storage registers for controlling said pulse generator to generate pulses in the correct direction along said $x$ and $y$ axes.

18. Pulse allotting system of curve tracing equipment as recited in claim 17 wherein said direction controlling means comprises a direction memory which stores the signs corresponding to the increments $\Delta x, \Delta y$.

19. Pulse allotting system of curve tracing equipment as recited in claim 18 further comprising input means adapted to receive numerical input data and connected to said first and second storage registers, said second shift pulse generator means and said direction memory, said input means being operative to load said first and second storage means and read into said direction memory the type of curve to be traced, said input means being thereafter operative to start said second shift pulse generator means.

20. Pulse allotting system of curve tracing equipment as recited in claim 19 wherein said input means comprises a tape reader and control means connected to said first and second storage means and said second shift pulse generator means for reading a tape bearing numerical control data, and decoder means connected to said tape reader and control means for decoding the type of curve to be traced and reading the decoded information into said direction memory.

21. Pulse allotting system of curve tracing equipment as recited in claim 20 wherein said pulse allotting means includes a pulse generator responsive to said first and second accumulating register sign memories to generate after each second judgement is affected a pulse in either the $x$ axis or the $y$ axis or a pulse in both the $x$ and the $y$ axes depending upon the polarities of the contents of said accumulating register after the selections of said first and second judging points further comprising, stopping means connected to said tape reader and control means for storing numerical information proportional to the distance between the starting point and the end point of the curve to be traced and responsive to the output of said pulse generator for stopping said second shift pulse generator when said curve has been traced to its end point.

22. Pulse allotting system of curve tracing equipment as recited in claim 21 wherein said stopping means comprises a first step register connected to said tape reader and control means for receiving numerical information equal to the $x$ distance between the starting point and the end point of the curve to be traced, a second step register connected to said tape reader and control means for receiving numerical information equal to the $y$ distance between the starting point and the end point of the curve to be traced, add/subtract means controlled by said direction memory and responsive to said pulse generator for incrementally decreasing the absolute value of the contents of said first and second step registers according to whether said pulse generator produces a pulse in the X direction or the Y direction or in both the X and Y directions, and zero-test means connected to said first and second step registers for stopping said second shift pulse generating means when the contents of both said first and second step registers are zero.

23. Pulse allotting system of curve tracing equipment as recited in claim 20 further comprising circular arc and quadratic curve generating means responsive to said code discriminating circuit means, said decoder and said direction memory for incrementally adding or subtracting the values $\Delta x/2$, $\Delta y/2$ to or from the contents of respective ones of said first and second storage registers so that the contents of said first and second storage registers becomes the same as said judging points, and for subtracting a value proportional to $\Delta y^2/4$ from said accumulating register when the contents of one of said storage registers is added thereto and adding a value proportional to $\Delta x^2/4$ to said accumulating register when the contents of the other of said storage registers is subtracted therefrom.

24. Pulse allotting system of curve tracing equipment as recited in claim 23 wherein said circular arc and quadratic curve generating means comprises second add/subtract means responsive to the pulse generated by said shift pulse generator means and controlled by said decoder and said direction memory of adding or subtracting the values $\Delta x/2$, $\Delta y/2$ to or from the contents of respective ones of said first and second storage registers, and third add/subtract means responsive to the pulses generated by said shift pulse generator means and controlled by said decoder and said direction memory for subtracting a value proportional to $\Delta y^2/4$ from said accumulating register when the contents of one of said storage registers is added thereto and adding a value proportional to $\Delta x^2/4$ to said accumulating register when the contents of the other of said storage registers is subtracted therefrom.

* * * * *